United States Patent [19]

Ettelbrueck

[11] Patent Number: 5,336,898
[45] Date of Patent: Aug. 9, 1994

[54] METHOD AND DEVICE FOR AUTOMATICALLY DETERMINING THE DIMENSIONS OF PRINTING CYLINDERS HAVING A DIAMETER COUNTER

[75] Inventor: Ruediger Ettelbrueck, Aschheim, Fed. Rep. of Germany

[73] Assignee: Maschinenfabrik Kaspar Walter GmbH & Co. KG, Munich, Fed. Rep. of Germany

[21] Appl. No.: 87,366

[22] Filed: Jul. 8, 1993

[30] Foreign Application Priority Data

Jul. 22, 1992 [DE] Fed. Rep. of Germany ....... 4224253

[51] Int. Cl.$^5$ ............................................. G01N 21/86
[52] U.S. Cl. ...................................... 250/560; 356/387
[58] Field of Search .......................... 250/560, 223 R; 356/383, 384, 386, 387

[56] References Cited

U.S. PATENT DOCUMENTS

| | | |
|---|---|---|
| 3,555,288 | 1/1971 | Morenius . |
| 4,676,648 | 6/1987 | Schulz et al. ...................... 356/386 |
| 5,043,588 | 8/1991 | DiGrande et al. ................. 356/386 |
| 5,090,757 | 2/1992 | Huber et al. . |

FOREIGN PATENT DOCUMENTS

| | | |
|---|---|---|
| 3731488A1 | 3/1988 | Fed. Rep. of Germany . |
| 4010200A1 | 10/1990 | Fed. Rep. of Germany . |
| 2195322A | 4/1988 | United Kingdom . |

Primary Examiner—David C. Nelms
Assistant Examiner—Que T. Le
Attorney, Agent, or Firm—Finnegan, Henderson, Farabow, Garrett & Dunner

[57] ABSTRACT

The method and the device for automatically determining the geometrical dimensions of printing cylinders to be fed to a treatment process is based on the idea of attaching, to a crane installation (1, 10) provided for the cylinder conveyance, an on-off photocell control device (4) which can be lowered vertically and whose vertical displacement distance is determined as count value. As soon as the on-off photocell control device path is interrupted by the printing cylinder (Z) presented, a second counter runs which is stopped again as soon as the on-off photocell control device is cleared again when the lower horizontal tangent to the cylinder casing is reached. From the relationship of the total distance traversed by the on-off photocell control device and the second count value, which specifies the masking-out of the on-off photocell control device by the printing cylinder, not only the precise diameter of the cylinder (Z), but also the position of the cylinder axis can be determined. Vertically and horizontally displaceable clamping jaws (K1, K2) attached to the crane installation (1, 10) can consequently be brought into alignment with the cylinder axis and be displaced horizontally from an outer starting position until the clamping position on the printing cylinder (Z) to be conveyed is reached. A further counting operation determines the displacement path of the clamping jaws (K1, K2), from which the cylinder length can be calculated.

5 Claims, 3 Drawing Sheets

⌀ CYLINDER DIAM. = b2 - b1

CENTRE X = b2 + a - (b2 - b1)/2

FACE LENGTH L = l - 2d

METHOD AND DEVICE FOR AUTOMATICALLY DETERMINING THE DIMENSIONS OF PRINTING CYLINDERS HAVING A DIAMETER COUNTER

DESCRIPTION

The invention relates to a method for automatically determining the geometrical dimensions of printing cylinders to be fed to a preferably continuous treatment process comprising a plurality of work stations, which printing cylinders are conveyed by means of a controlled crane installation to the individual work stations, in particular and especially, to and within an electroplating installation.

Prior to the treatment of printing cylinders, for example of gravure printing cylinders, in electroplating installations, not only the processing parameters, but also the cylinder dimensions, in particular the face length and the diameter, have to be entered in the central control installation. From these values, the central processor in the control system of the installation calculates the various operationally specific parameters, such as current, anode displacement, cylinder speed, etc..

Until now, the cylinder dimensions have either been entered manually at each individual machine or, if an automated line is involved, at an input panel at the start of the line, in which case a higher-ranking control system then conveys these data in each case to the individual machines via a data transfer system.

This manual data input method is not only expensive in terms of staff and time but also involves the risk of an input error at the same time.

The object of the invention is to provide a method and a device with which the cylinder dimensions can be automatically determined for printing cylinder treatments of the type mentioned and can be entered in the central control system of a respective treatment machine or of an automated line.

In relation to the method, the invention is characterised in that starting from a fixed vertical position above a printing cylinder mounted horizontally on a positionally precisely defined support, a vertically displaceable on-off photocell control device is lowered in such a manner that the light path is interrupted by the printing cylinder presented and is then cleared again when the lower horizontal tangent to the cylinder casing is reached, the path distance the on-off photocell control device is lowered is determined as a summed first count value up to the instant the on-off photocell control device is cleared again, the distance over which the on-off photocell control device is interrupted by the printing cylinder is determined as a second count value, from the relationship of the first to the second count value, the diameter and the actual position of the cylinder axis are determined, and in that two clamping jaws, precisely opposite one another in the cylinder axis direction, of a pickup device for the printing cylinder are brought to the position found for the cylinder axis and are then displaced axially from fixed axial starting positions until the printing cylinder is clamped, the axial displacement distance of the clamping jaws being determined as third count value and the face length of the printing cylinder being determined therefrom.

A device for automatically determining the geometrical dimensions of printing cylinders to be fed to a treatment process which are conveyed by means of a controlled crane installation to at least one treatment station is characterised, according to the invention, by a vertically displaceable on-off photocell control device attached to the crane installation and having a mutual spacing of light transmission cell and light reception cell which is greater than the largest printing cylinder diameter encountered, an electronic absolute distance sensor which determines the vertical displacement distance of the on-off photocell control device while it is being lowered as a first summed count value, commencing from a fixed upper starting position above a printing cylinder presented on a support having a known position and continuing until a final position underneath the printing cylinder which interrupts the on-off photocell control device is reached, a diameter counter, which determines the diameter of the printing cylinder as an intermediate count value when it is triggered by the vertically displaceable on-off photocell control device as the latter is interrupted by the printing cylinder and is cleared again when the lower horizontal tangent to the cylinder casing is reached, a processor which calculates from the relationship of the first count value and the intermediate count value the position of the printing cylinder axis and provides a control command for the positioning, aligned with the cylinder axis, of two clamping jaws connected to the crane installation and displaceable horizontally towards one another, and also by a distance counter which determines the horizontal displacement distance of the clamping jaws from a fixed starting position until a defined clamping of the printing cylinder between the two clamping jaws is reached as third count value, from which the face length of the printing cylinder is calculated in the processor.

Preferably, the on-off photocell control device and the clamping jaws are both mounted in a vertically displaceable crossbeam of the crane installation.

It is advantageous if the on-off photocell control device is mounted at the free ends, situated opposite one another, of a swivelling bracket which is attached to the crossbeam and which is preferably attached to a holding device which can be displaced longitudinally on the crossbeam and which can also optionally be displaced further in the transverse direction to the cylinder to be measured.

The invention and advantageous details are explained in greater detail below with reference to the drawing in an exemplary embodiment. In the drawing.

Figure 1:
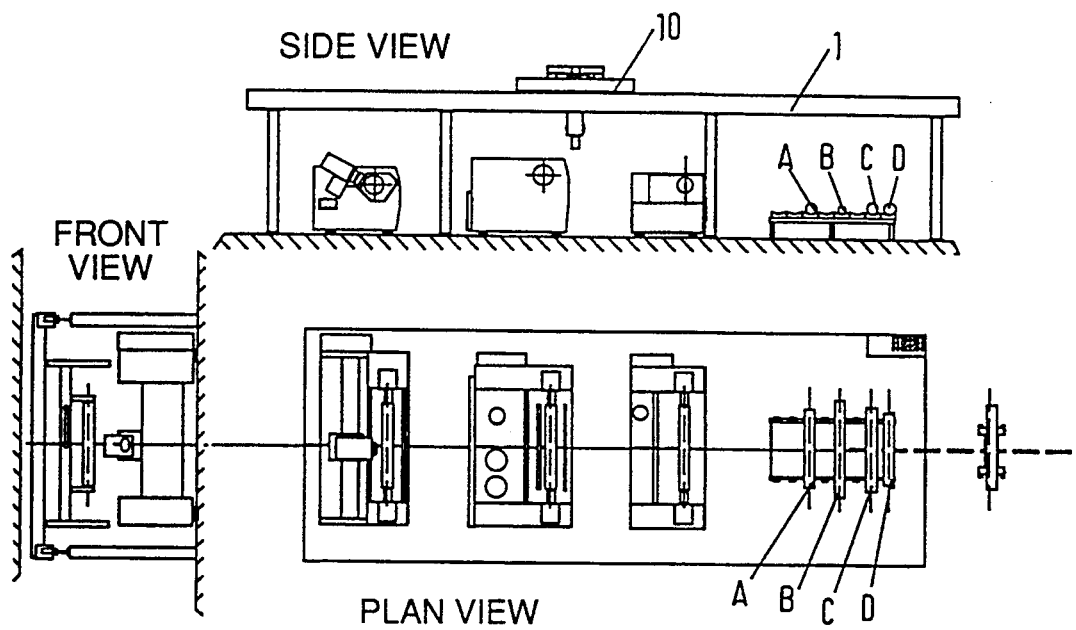
FIG. 1 shows an example of an automated line of an electroplating installation for printing cylinders, the upper part showing the side view, the lower part showing the plan view and, on the left hand side and tilted through 90°, the front view diagrammatically.

FIG. 1 shows an automated line, known in principle, of an electroplating installation for gravure printing cylinders. The individual treatment stations are spanned by a gantry crane installation 1 whose travelling crane 10 serves to convey a plurality of printing cylinders A, B, C and D presented on a storage frame and having different cylinder dimensions from one treatment station to the next. The crane installation 1 is of interest in connection with the invention insofar as it is advantageously used as carrier device for the measuring device according to the invention.

As the above definition of the invention already reveals, the solution according to the invention comprises measuring the cylinder dimensions by means of an on-off photocell control device, which is displaceable in a defined manner, and digital counting devices, these assemblies advantageously being mounted on the displaceable part 10 of the crane installation 1, which displaceable part 10 conveys the individual cylinders A to D from one treatment station to the next. According to the invention, the manual entry of the cylinder data is completely dispensed with; on the contrary, these are automatically produced by means of certain devices connected to the crane transposer, from which then not only the actuating commands for crane positioning and crane displacement, but also the abovementioned operationally specific parameters can be determined.

Figure 2:
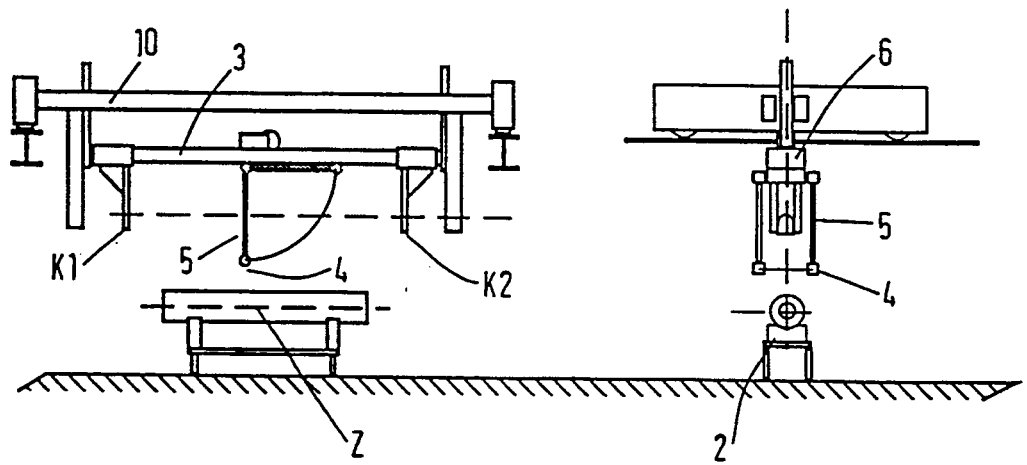
FIG. 2 shows the diagrammatic representation of a measuring device according to the invention.

As the diagrammatic representation of FIG. 2 reveals, the gantry crane installation 1, 10 has a vertically displaceable crossbeam 3 to which, on the one hand, two clamping jaws K1, K2, which are displaceable in a defined manner by positioning motors in the direction of the crossbeam 3 and, on the other hand, an on-off photocell control device are attached. The actual on-off photocell device 4, with transmitter and receiver cell, is attached to the free end of a bracket 5 which can be swivelled from the horizontal to the vertical, the spacing of the two bracket limbs, and consequently the spacing of transmission and reception cell of the on-off photocell control device 4 being chosen as greater than corresponds to the largest diameter to be expected of the printing cylinders A to D to be measured. As the right-hand representation of FIG. 2 reveals, the swivelling bracket 5 is attached to a holding device 6 which can be displaced on the crossbeam 3 longitudinally and also transversely thereto within certain limits. The dimensions of a printing cylinder Z, in the example shown a hollow cylinder, presented on a V-block support 2 are to be automatically determined, and this is explained below with reference to FIGS. 3 and 4 as a sequence of function. The vertical and horizontal scales shown in FIG. 3 are only to be understood symbolically as path sections which can be determined incrementally by distance counters.

The hollow cylinder Z is presented on the V-block support 2 of a repository stand in a defined position underneath the crane track. The displaceable part 10 of the crane installation 1 having crossbeam 3 is moved into the position of the V-block support 2 and the clamping jaws K1, K2 are situated in their outer end position.

Figure 3A:
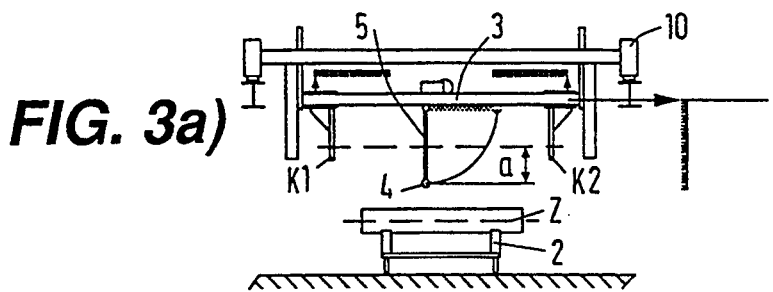
FIG. 3 shows in six individual representations (a) to (f) the method sequence in a method according to the invention for determining printing cylinder dimensions.
Figure 4:
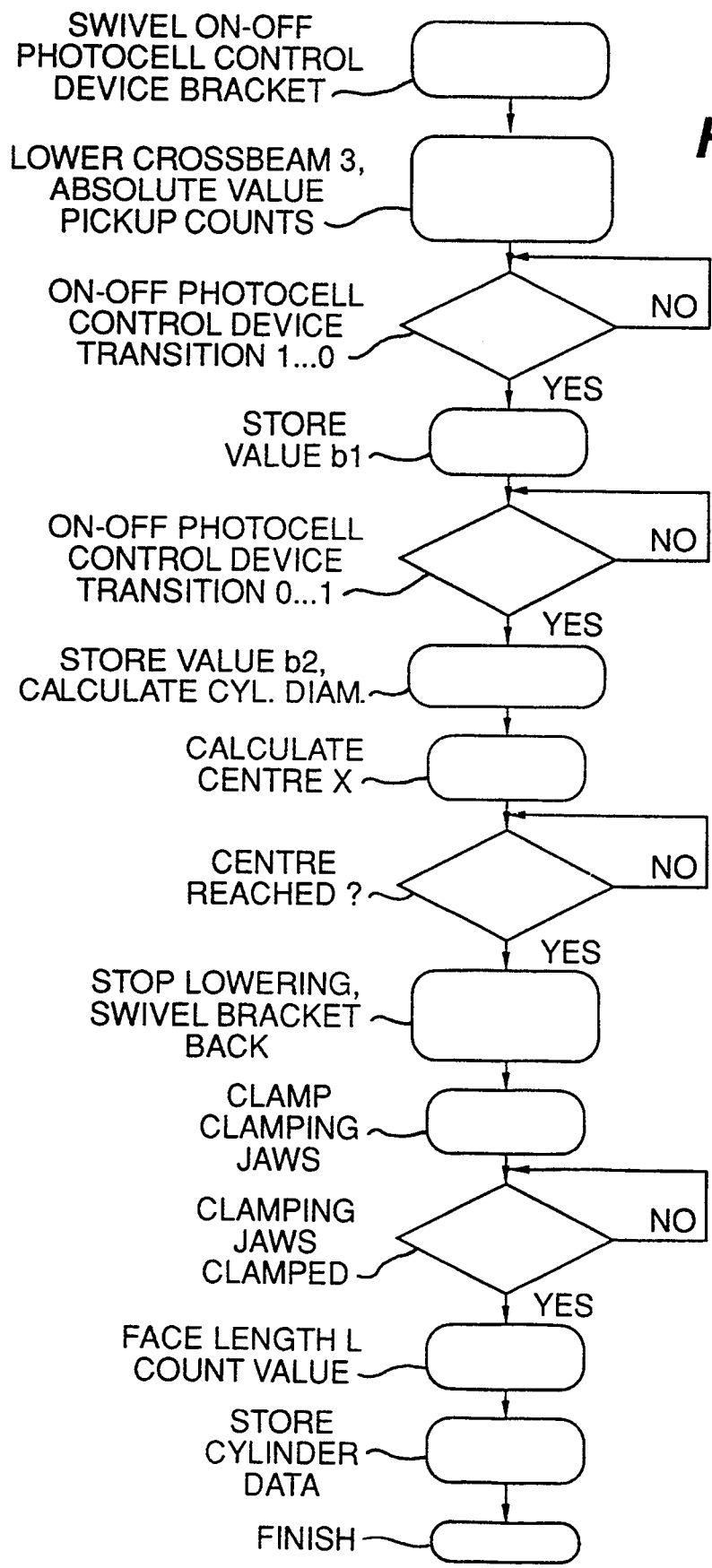
FIG. 4 shows a flow chart to further clarify the method sequence shown with reference to FIG. 3.

Before the start of the cylinder measurement sequence, the on-off photocell control device 4 is folded down by means of the swivelling bracket 5 (FIG. 3(a)), the on-off photocell control device 4 being activated simultaneously by means of the electronic control system. The vertical spacing a between the connecting line of the clamping jaws K1 and K2 and the light path of the on-off photocell control device 4 is known and stored beforehand. In this connection, the vertical position of the on-off photocell control device 4 is chosen in such a way that the vertical spacing a between the on-off photocell control device 4 and the central connecting line, indicated in FIG. 3(a), between the clamping jaws K1 and K2 corresponds to at least half the largest cylinder diameter to be expected. The crossbeam of the crane installation 1 is now lowered vertically, the distance lowered being measured at the same time by means of an electronic absolute distance sensor (absolute value pickup) and summed in a first counter device.

Figure 3B:
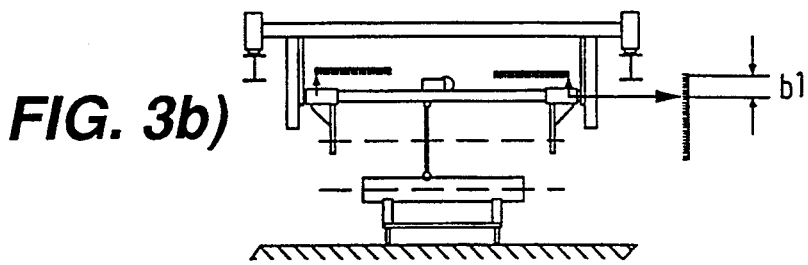
Figure 3C:
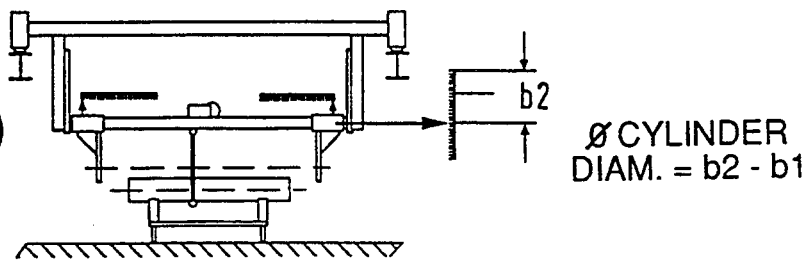
Figure 3D:
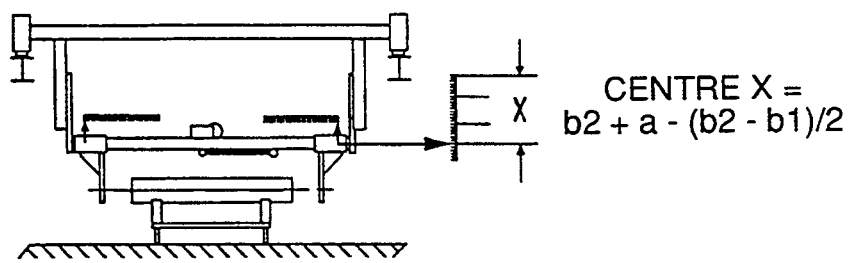

As the crossbeam 3 or crane bridge is lowered by the distance b1 (FIG. 3(b)), the on-off photocell control device 4 is interrupted by the cylinder Z. The interruption signal thus triggered thereby starts a second (diameter) counter in the electronic control system as a function of the first (vertical) counter. This intermediate counting is interrupted as soon as the on-off photocell control device is cleared again on reaching the lower horizontal tangent to the casing of the cylinder Z after traversing distance b2. The relationship between the (second) count value b2, that is to say the intermediate counting of the vertical counting, and the (first) count value b1 of the diameter counting gives, on the one hand, the actual cylinder diameter (FIG. 3(c)) and, on the other hand, the actual position of the cylinder axis. The diameter X, and taking account of the stored distance value a, the actual axis position of the cylinder Z, is consequently initially known for the data input in order in this way to be able to position the crossbeam 3 exactly on the axial line of the cylinder Z (FIG. 3(d)).

Figure 3E:
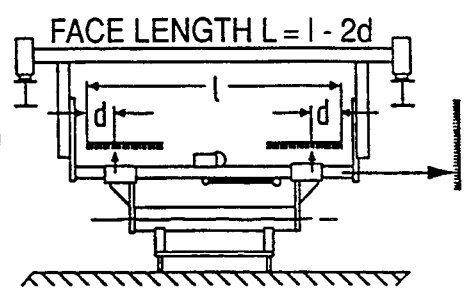

The crane jaws K1, K2 are subsequently axially displaced symmetrically with respect to one another until they reach the cylinder Z and clamp it with a defined contact pressure (FIG. 3(e)). Starting from the outer position of the clamping jaws K1, K2 and beginning with the travel movement of the clamping jaws K1 and K2, a further incremental path distance counter (not shown) goes into action and this determines the distance d until the clamping position is reached. The face length L of the cylinder Z is calculated from the count value d in the central processor. Any pickup parts present must, of course, be subtracted in counting (calculating) the face length L. Suitable default values are stored beforehand.

Figure 3F:
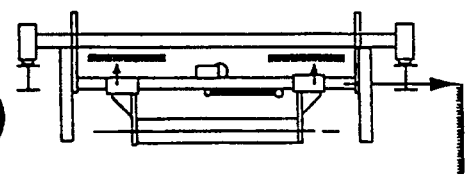

After the displacement of the clamping jaws K1, K2 has been switched off by force control, the cylinder Z is lifted (FIG. 3(f)), brought into the upper position and then conveyed above the first treatment station of the electroplating installation. Simultaneously with the conveyance to the first treatment station, the cylinder data found are transmitted to all the other treatment stations in order to specify the operationally specific parameters.

What is claimed is:

1. Method for automatically determining the geometrical dimensions of printing cylinders (A to D, Z) to be fed to a treatment process, characterised in that starting from a fixed vertical position above a printing cylinder (Z) mounted horizontally on a positionally precisely defined support, a vertically displaceable on-off photocell control device (4) is lowered in such a manner that the light path is interrupted by the printing cylinder (Z) presented and is then cleared again when the lower horizontal tangent to the cylinder casing is reached, the distance the on-off photocell control device (4) is lowered is determined as a summed first count value up to the instant the on-off photocell control device (4) is cleared again, the distance over which the on-off photocell control device is interrupted by the printing cylinder (Z) is determined as a second count value, from the relationship of the first to the second count value, the diameter of the printing cylinder (Z) and the actual position of the cylinder axis are determined, and two clamping jaws (K1, K2), opposite one another in the cylinder axis direction, of a pickup device for the printing cylinder are brought to the position found for the cylinder axis and are displaced axially from fixed axial starting positions until the printing cylinder (Z) is clamped, the axial displacement distance of the clamping jaws (K1, K2) being determined as the third count value and the face length of the printing cylinder (Z) being determined therefrom.

2. Device for automatically determining the geometrical dimensions of printing cylinders to be fed to a treatment process which are conveyed by means of a controlled crane installation (1, 10) to at least one treatment station, characterised by a vertically displaceable on-off photocell control device (4, 5) attached to the crane installation (1) and having a mutual spacing of light transmission cell and light reception cell which is greater than the largest printing cylinder diameter encountered, an electronic absolute distance sensor which determines the vertical displacement distance of the on-off photocell control device (4, 5) while it is being lowered as a first summed count value, commencing from a fixed upper starting position above a printing cylinder (Z) presented on a support (2) having a known position and continuing until a final position underneath the printing cylinder (Z) which interrupts the on-off photocell control device is reached, a diameter counter, which determines the diameter of the printing cylinder (Z) as intermediate count value when it is triggered by the vertically displaceable on-off photocell control device (4, 5) as the latter is interrupted by the printing cylinder (Z) and is released again when the lower horizontal tangent to the cylinder casing is reached, a processor which calculates from the relationship of first count value and intermediate count value the position of the printing cylinder axis and provides a control command for the positioning, aligned with the cylinder axis, of two clamping jaws (K1, K2) connected to the crane installation (1, 10) and displaceable horizontally towards one another, and by a distance counter which determines the horizontal displacement distance of the clamping jaws (K1, K2) from a fixed starting position until a defined clamping of the printing cylinder between the two clamping jaws (K1, K2) is reached as a third count value, from which the face length of the printing cylinder (Z) is calculated in the processor.

3. Device according to claim 2, characterised in that the on-off photocell control device (4, 5) and the clamping jaws (K1, K2) are mounted in a vertically displaceable crossbeam (3) of the crane installation (1, 10).

4. Device according to claim 3, characterised in that the on-off photocell control device (4, 5) is mounted at the free ends, situated opposite one another, of a swivelling bracket (5) which is attached to the crossbeam (3).

5. Device according to claim 4, characterised in that the swivelling bracket (5) is attached to a holding device (6) which can be displaced longitudinally and/or transversely on the crossbeam (3).

* * * * *